UNITED STATES PATENT OFFICE.

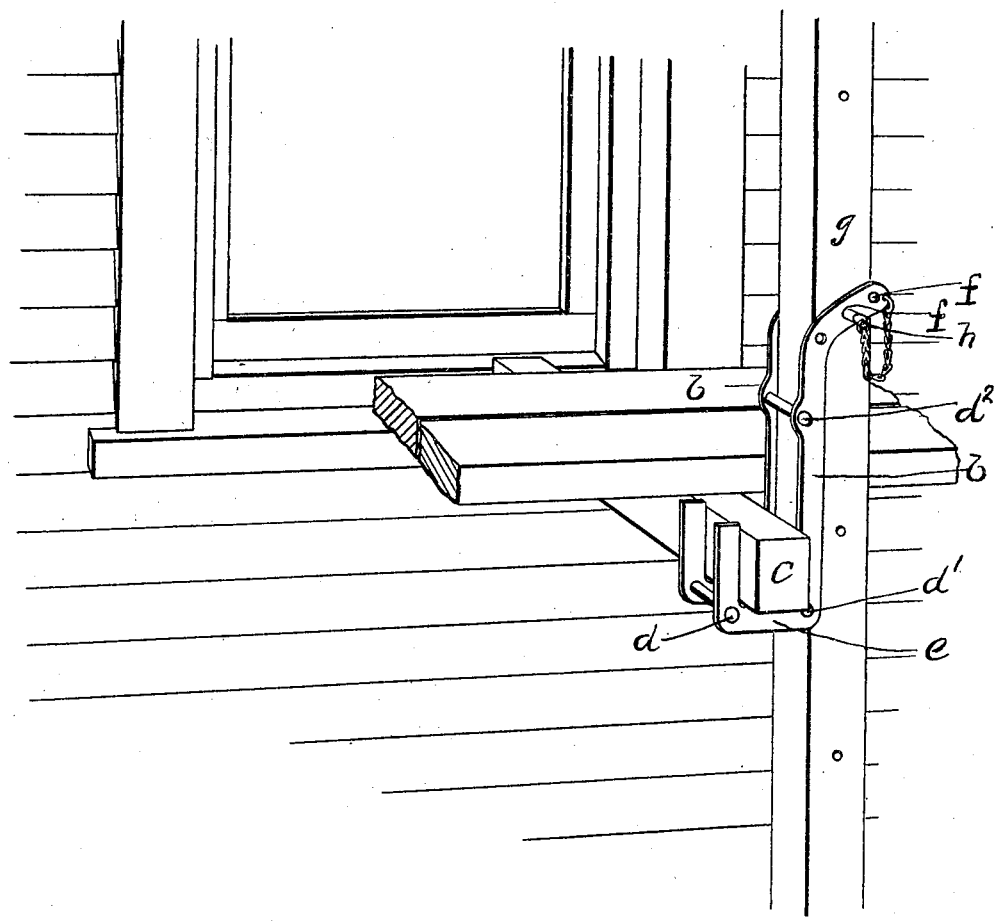

PETER CAPORALE, OF HARTFORD, CONNECTICUT.

SAFETY SCAFFOLD-SUPPORT.

No. 809,490.  Specification of Letters Patent.  Patented Jan. 9, 1906.

Application filed September 29, 1905. Serial No. 280,672.

*To all whom it may concern:*

Be it known that I, PETER CAPORALE, a subject of the King of Italy, residing at Hartford, in the county of Hartford and State of Connecticut, have invented certain new and useful Improvements in Safety Scaffold-Supports, of which the following is a specification.

The object of the invention is to produce a safety-support for the floor-beams of a scaffold-staging.

The drawing shows a perspective view of my device in place on the scaffolding.

My device, which I call a "scaffold-flooring support," is indicated in general at $a$ and is made up of a pair of side members $b\ b$, joined and spaced opposite one another by the brace-bars $d\ d'\ d^2$. The lower ends of the side members are bent to U shape, as indicated at $e$, to receive and retain the floor-beams $c$ for the scaffolding, as hereinafter more fully described. The upper ends of the side members are bent rearwardly to form attaching-ears, which are provided with registering holes $f\ f$.

My support is used in the following manner: The scaffold-uprights are pierced at the proper points by transverse holes, and the attaching-ears embrace these uprights $g$, and a pin $h$, passing through the holes in the ears and the upright, secures the support in place. These scaffolding-uprights are used over and over again, and by having a series of holes F F in the ears my device may be attached wherever there is a convenient hole in an upright. In this way only a small number of holes need be made in the uprights, thus not immensely weakening them. The braces $d'\ d^2$ hold the hanger out from the upright to leave the U-shaped bend unobstructed. The flooring-beam for the scaffolding is laid in the U-shaped bend at the lower end of the support and extends to the sides of the building, where it may be fastened, as desired.

I claim as my invention—

1. In a scaffold-support the side members braced from and secured to one another, rearwardly-extending ears at the upper ends of said side members, by means of which the device may be secured in place, a U-shaped recess formed at the lower end of the device by extending the ends of said members forwardly and then upwardly, and brace-bars providing a stop to hold said U-shaped recess free from the part to which the device is attached.

2. In a scaffold-support the side arms, U-shaped on their lower ends, rearwardly-extending ears lying at each side of the scaffold-upright, brace-bars connecting the side members, and means for securing the whole to the upright.

3. A scaffold-flooring support consisting of two side members U-shaped at their lower ends, brace-bars connecting the side members, holes oppositely arranged in the upper ends of the side members, and a securing-pin adapted to pass through said holes and a hole in the upright.

4. The combination with a scaffold including uprights, floor-beams, a platform, of means secured to the uprights for securing the floor-beams, said means comprising side members, brace-bars securing said side members together, attaching-ears formed by extending the upper ends of the side members rearwardly adapted to lie one on each side of the upright, registering holes in said attaching-ears, and the upright, a pin extending through the holes in the ears and upright, the lower ends of the side members being bent forwardly and upwardly forming a recess to receive and retain said flooring-beams.

In testimony whereof I affix my signature in presence of two witnesses.

PETER CAPORALE.

Witnesses:
SALVATOR D'ESOPO,
JOSEPHIN D'ESOPO.